US009076483B2

(12) United States Patent
Hamersley et al.

(10) Patent No.: US 9,076,483 B2
(45) Date of Patent: Jul. 7, 2015

(54) DVD REPLICATIONS SYSTEM AND METHOD

(75) Inventors: Alan Bruce Hamersley, Newbury Park, CA (US); Holger Hofmann, Thousand Oaks, CA (US); John Matthew Town, Ojai, CA (US)

(73) Assignee: Thomson Licensing LLC, Boulogne-Billancourt (FR)

( * ) Notice: Subject to any disclaimer, the term of this patent is extended or adjusted under 35 U.S.C. 154(b) by 1629 days.

(21) Appl. No.: 12/083,003

(22) PCT Filed: Apr. 12, 2006

(86) PCT No.: PCT/US2006/013732
§ 371 (c)(1),
(2), (4) Date: Apr. 1, 2008

(87) PCT Pub. No.: WO2007/044070
PCT Pub. Date: Apr. 19, 2007

(65) Prior Publication Data
US 2009/0113555 A1    Apr. 30, 2009

Related U.S. Application Data

(60) Provisional application No. 60/725,614, filed on Oct. 11, 2005.

(51) Int. Cl.
*G06F 7/04* (2006.01)
*G06F 17/30* (2006.01)
(Continued)

(52) U.S. Cl.
CPC .......... *G11B 20/00086* (2013.01); *G06F 21/10* (2013.01); *G06Q 20/1235* (2013.01);
(Continued)

(58) Field of Classification Search
CPC ................... G11B 20/00449; G11B 20/00579; G11B 20/10; G11B 2220/2562; G11B 7/26; G11B 7/261; G11B 7/265; G11B 20/00086; G06F 21/10; G06Q 20/1235
USPC ............... 380/200–203, 210, 217; 726/31–33
See application file for complete search history.

(56) References Cited

U.S. PATENT DOCUMENTS 4,358,786 A * 11/1982 Pfleiderer et al. ............. 386/300
4,839,657 A    6/1989 Chikhani et al.
(Continued)

FOREIGN PATENT DOCUMENTS

CN    1349350 A    10/2000
CN    1438641       8/2003
(Continued)

OTHER PUBLICATIONS

Search report dated Oct. 29, 2006.
(Continued)

*Primary Examiner* — Shewaye Gelagay
*Assistant Examiner* — Trong Nguyen
(74) *Attorney, Agent, or Firm* — Robert D. Shedd; Robert B. Levy

(57) ABSTRACT

A system and method for replicating protected content on media includes a controller for enabling replicating of media content from partial encoded content received at a location of the controller. A media recorder is coupled to the controller and including a modulation process (104) to complete encoding of the partial encoded content to record media content on media readable by a device other than the media recorder.

19 Claims, 3 Drawing Sheets

(51) Int. Cl.
| | |
|---|---|
| *H04N 7/16* | (2011.01) |
| *H04N 7/167* | (2011.01) |
| *G11B 20/00* | (2006.01) |
| *G06F 21/10* | (2013.01) |
| *G06Q 20/12* | (2012.01) |
| *G07F 17/16* | (2006.01) |
| *G07F 17/26* | (2006.01) |
| *G11B 20/10* | (2006.01) |
| *G11B 20/12* | (2006.01) |

(52) U.S. Cl.
CPC ............... *G07F17/16* (2013.01); *G07F 17/26* (2013.01); *G11B 20/00115* (2013.01); *G11B 20/00427* (2013.01); *G11B 20/00449* (2013.01); *G11B 20/00579* (2013.01); *G11B 20/00594* (2013.01); *G11B 20/00601* (2013.01); *G11B 20/00688* (2013.01); *G11B 20/00855* (2013.01); *G11B 20/00884* (2013.01); *G11B 20/00971* (2013.01); *G11B 20/10* (2013.01); *G11B 2020/1288* (2013.01); *G11B 2220/2541* (2013.01); *G11B 2220/2579* (2013.01)

(56) References Cited

U.S. PATENT DOCUMENTS

| | | | |
|---|---|---|---|
| 5,418,713 | A | 5/1995 | Allen |
| 5,794,217 | A | 8/1998 | Allen |
| 5,909,638 | A | 6/1999 | Allen |
| 5,949,688 | A | 9/1999 | Montoya et al. |
| 6,480,188 | B1 | 11/2002 | Horsley |
| 6,578,149 | B1 | 6/2003 | Kawamae et al. |
| 6,591,391 | B1 | 7/2003 | Rowenhorst et al. |
| 6,674,428 | B2 | 1/2004 | Horsley |
| 6,687,826 | B1 | 2/2004 | Owa |
| 6,782,190 | B1 | 8/2004 | Morito |
| 7,080,041 | B2 | 7/2006 | Nagel |
| 7,908,477 | B2 | 3/2011 | Eto |
| 2001/0015964 | A1 | 8/2001 | Fuchisawa |
| 2001/0036268 | A1 | 11/2001 | Kuroda et al. |
| 2002/0056118 | A1* | 5/2002 | Hunter et al. .................. 725/87 |
| 2002/0062357 | A1 | 5/2002 | Srinivasan |
| 2002/0078176 | A1 | 6/2002 | Nomura et al. |
| 2002/0184490 | A1 | 12/2002 | McCown et al. |
| 2002/0199205 | A1 | 12/2002 | Sonawane et al. |
| 2003/0009668 | A1 | 1/2003 | Chan et al. |
| 2003/0036974 | A1 | 2/2003 | Allen |
| 2003/0135467 | A1 | 7/2003 | Okamoto |
| 2003/0142959 | A1 | 7/2003 | Qu |
| 2003/0147339 | A1* | 8/2003 | Selinfreund et al. ....... 369/275.3 |
| 2003/0152368 | A1 | 8/2003 | Kitani |
| 2003/0152369 | A1 | 8/2003 | Isobe et al. |
| 2003/0155417 | A1 | 8/2003 | Fairman |
| 2004/0162779 | A1 | 8/2004 | Kramer |
| 2004/0165698 | A1 | 8/2004 | Masaaki et al. |
| 2004/0225575 | A1 | 11/2004 | List et al. |
| 2004/0246866 | A1 | 12/2004 | Sato et al. |
| 2004/0267790 | A1 | 12/2004 | Pak et al. |
| 2005/0010790 | A1 | 1/2005 | Lang |
| 2005/0038997 | A1* | 2/2005 | Kojima et al. ................. 713/165 |
| 2005/0049931 | A1 | 3/2005 | Wisnudel et al. |
| 2005/0050571 | A1 | 3/2005 | Wisnudel et al. |
| 2005/0068874 | A1 | 3/2005 | Heemskerk et al. |
| 2005/0154682 | A1 | 7/2005 | Taylor |
| 2005/0204019 | A1 | 9/2005 | Flynn et al. |
| 2005/0204398 | A1 | 9/2005 | Ryal |
| 2006/0031916 | A1 | 2/2006 | Colter et al. |
| 2006/0051060 | A1 | 3/2006 | Dorovanessian et al. |
| 2006/0078111 | A1* | 4/2006 | Hollar .......................... 380/201 |
| 2006/0117374 | A1* | 6/2006 | Kortum et al. ................ 725/139 |
| 2007/0166014 | A1 | 7/2007 | Schwarzmann |
| 2007/0198855 | A1 | 8/2007 | Kuroda et al. |
| 2007/0206732 | A1 | 9/2007 | Ito et al. |
| 2007/0230297 | A1 | 10/2007 | Kitani |
| 2009/0113555 | A1 | 4/2009 | Hamersley et al. |
| 2009/0245055 | A1 | 10/2009 | Hamersley et al. |

FOREIGN PATENT DOCUMENTS

| | | |
|---|---|---|
| CN | 2671261 Y | 1/2005 |
| EP | 1148488 | 10/2001 |
| EP | 1302882 | 4/2003 |
| EP | 1353330 | 10/2003 |
| EP | 1226717 | 7/2004 |
| EP | 1526725 | 4/2005 |
| FR | 285166 | 8/2004 |
| FR | 2860904 | 4/2005 |
| JP | 11175539 | 7/1999 |
| JP | 11242569 | 9/1999 |
| JP | 11250572 | 9/1999 |
| JP | 200076141 | 3/2000 |
| JP | 2000076141 | 3/2000 |
| JP | 2000113589 | 4/2000 |
| JP | 20000113589 | 4/2000 |
| JP | 2001307427 | 11/2001 |
| JP | 2002-152658 | 5/2002 |
| JP | 2005018931 | 1/2005 |
| JP | 2005-267669 | 9/2005 |
| JP | 2006185304 | 7/2006 |
| JP | 5078897 | 3/2009 |
| JP | 5078897 | 11/2012 |
| JP | 5193999 | 2/2013 |
| KR | 20010018364 | 3/2001 |
| KR | 20010035324 | 5/2001 |
| KR | 20030092964 | 12/2003 |
| KR | 20050096700 | 10/2005 |
| WO | WO9735311 | 9/1997 |
| WO | WO99/35753 | 7/1999 |
| WO | WO0120907 | 3/2001 |
| WO | WO03036641 | 5/2001 |
| WO | WO0193134 | 12/2001 |
| WO | WO0205128 | 1/2002 |
| WO | WO03058618 | 7/2003 |
| WO | WO2005024608 | 3/2005 |
| WO | WO2005024811 | 3/2005 |
| WO | WO2005034422 | 4/2005 |
| WO | WO2005050907 | 6/2005 |
| WO | WO2005079369 | 9/2005 |
| WO | WO2005122164 | 12/2005 |
| WO | WO2007044092 | 4/2007 |
| WO | WO2007117341 | 10/2007 |

OTHER PUBLICATIONS

Business Wire: "Mix & Burn Selects SyncCast Technology to Advance CD-Burning Music Kiosk; Extensive Catalogs of Major Label Content Enhance the Retail Music Experience", Jul. 28, 2005.
Intel Corporation et al.: "Content Protection for Recordable Media Specification—Network Download Book," Aug. 5, 2004, pp. 3.1-3.11.
Office Action for U.S. Appl. No. 12/226,037 mailed May 26, 2011.
US ISR dated Dec. 14, 2006.
Bennett: "Understanding Recordable & Rewritable DVD", Optical Storage Technology Association, First Edition, Apr. 2004.
Carson et al: "Complete CSS Testing on DVD-Video Discs", Datarius Group, White Paper, May 2004.
Digipoints: "The Digital Knowledge Handbook", vol. III, Issue 9, Jul. 27, 2000, DVD Part Two.
Kesden: "ContentContent Scrambling System (CSS) Introduction", Lecture 33, Course 15-412. Dec. 6, 2000.
Non-Final Office Action for U.S. Appl. No. 12/083,273 mailed Jan. 25, 2012.
Taylor: "What Is DVD?", In: "DVD Demystified, 2nd Edition", 2001, McGraw-Hill, New York, NY US, ISBN: 978-0-07-135026-6.
Kesden: Operating Systems/Design and Implementation Course # 15-412; CSS: Introduction, Dec. 6, 2000, Retrieved from the Internet: URL:http://www.cs.cmu.edu/dsVDeCCS/Kesden/index.html [retrieved on Jul. 24, 2006].

* cited by examiner

DVD REPLICATIONS SYSTEM AND METHOD

CROSS-REFERENCE TO RELATED APPLICATIONS

This application claims the benefit, under 35 U.S.C. §365 of International Application PCT/US2006/013732, filed Apr. 12, 2006 which was published in accordance with PCT Article 21(2) on Apr. 19, 2007 in English and which claims the benefit of U. S. provisional patent application No. 60/725,614 filed Oct. 11, 2005.

FIELD OF THE INVENTION

The present invention generally relates to digital video recording devices and more particularly to systems and methods for downloading audio or video content in a secured way for in-home, in-store and factory replication of video content, including the security features used in read only memory storage devices and media.

BACKGROUND OF THE INVENTION

The motion picture and retail industry seeks a secure way of producing DVD-Video discs on-demand from DVD-Video content that is stored on a local server or delivered from a central storage server through high speed private networks. This would permit the availability of thousands DVD-Video titles from a deep catalog of movies that normally could not be easily inventoried in a retail or online store environment. The in-home solution allows for studios to sell content that is delivered and recorded to DVD in a secure manner.

Even though Content Scrambling System CSS has been marginalized, studio customers require the inclusion of CSS to be able to enforce prosecution of illegal copying of movie content through the Digital Millennium Copyright Act (DMCA).

Additionally, CSS keys that are provided by the CSS Licensing Authority can only be provided to licensed DVD disc replicators, DVD drive manufacturers and DVD authoring/compression facilities, content providers and production tool suppliers. Retail establishments, content providers and consumers are disallowed from having access to the CSS keys provided by the DVD CCA (Copy Control Association).

Approaches to be able to include CSS copy protection on video content recorded to recordable DVD media have been proposed. These approaches require retailers and recording hardware to manage CSS Disc and Title keys either directly or through receipt over a network and for the recordable media to have the CSS Disc keys securely embedded in proprietary recordable DVD disc media. This would require amendment to the CSS specification and license agreement, which would have to be proposed to and approved by the DVD Copy Control Association (CCA) Copy Protection Advisory Council (CPAC). This committee is comprised of rights holders, consumer electronics companies and computer manufacturers. Having such changes approved is difficult and very unlikely. These other approaches also require complex/costly hardware/software applications.

SUMMARY OF THE INVENTION

A system and method for replicating protected content on media includes a controller for enabling replicating of media content from partial encoded content received at a location of the controller. A media recorder is coupled to the controller and including a modulation process to complete encoding of the partial encoded content to record media content on media readable by a device other than the media recorder.

An apparatus for replicating protected content includes a media recorder for modulating partial encoded content received to complete encoding of the partial encoded content to derive media content for recording onto media readable by a device other than said media recorder. The partial encoded content is received by said recorder with Content Scrambling System (CSS) copy protection encryption which provides CSS encryption to the partially encoded content data stream without a need for retailers or consumers to have access to CSS keys.

A system and method for replicating protected content on a replayable media object includes a bitstream mastering center configured to partially encode content to produce a partially encoded content data stream. A transaction manager is configured to receive by a secured communication channel the partially encoded content data stream. Updates only, transaction manager is pre-loaded with content. The transaction manager is configured to provide users with ordering options for replicating content from the partially encoded data stream. A media burner is coupled to the transaction manager and configured to receive a media object. The burner includes a modulation process to complete encoding of the partially encoded content data stream received from the transaction manager such that the media object is readable by standard equipment.

A system for replicating protected content includes a media burner configured to receive a media object. The burner including a modulation process to complete encoding of partially encoded content received over a secure connection or locally stored, and which provides the partially encoded content to a user or users such that the media object is readable by standard equipment once complete encoding and recording is performed.

A method for replicating protected content includes providing a partially encoded content data stream, and for a consumer retail establishment, providing users with ordering options and a blank media object for creating a read only media object with selected content. The partially encoded content data stream is modulated at a site for recording the media object, such that the partially encoded content data stream becomes fully encoded content, and by recording on the media object the full encoded content, the media object is readable by standard equipment.

BRIEF DESCRIPTION OF THE DRAWINGS

The advantages, nature, and various additional features of the invention will appear more fully upon consideration of the illustrative embodiments now to be described in detail in connection with accompanying drawings wherein.

DETAILED DESCRIPTION OF THE INVENTION

Figure 1:
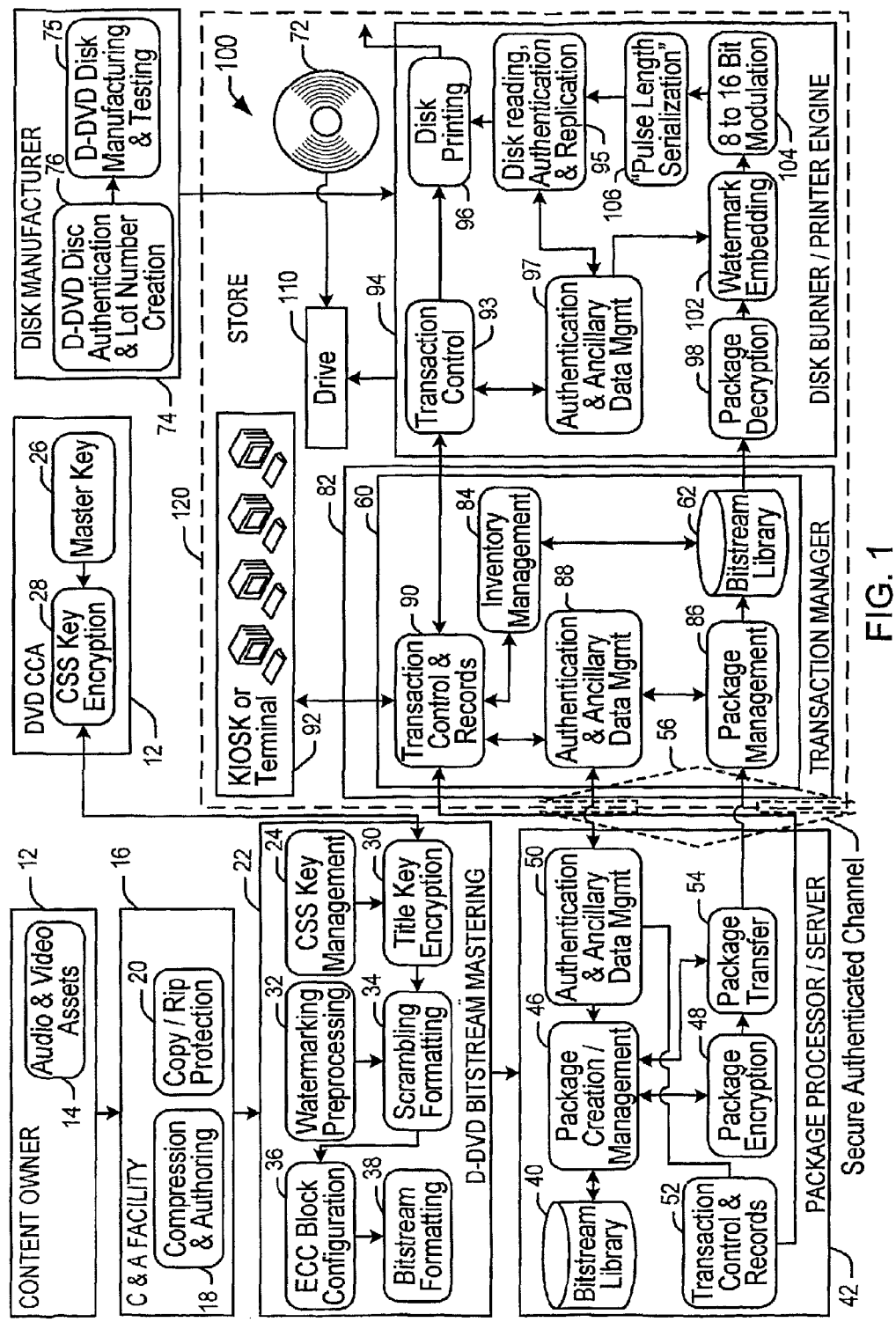
FIG. 1 is a block/flow diagram of an exemplary system/method for replicating media objects (e.g., DVD's) from a retail establishment in accordance with one exemplary embodiment of the present invention.

Methods and systems are provided to permit secure in-store (retail and Internet), in-factory and in-home creation of backward and forward compatible DVD-Video content recorded to "recordable pre-recorded DVD" discs that include the specification standard Content Scrambling System (CSS) copy protection encryption. The present invention bypasses the need for retailers or consumers to have access to CSS keys and permits the creation of a disc that is identical to a standard replicated DVD-Video disc. The CSS encryption along with other security and formatting is performed in advance. The present invention complies with CSS standards and may not require changes/updates to the DVD-Video or DVD CSS specifications and agreements.

Advantageously, the resultant disc that is provided to a consumer is identical to a DVD-Video Read Only Disc in formatting, logical structure, encoding, readout characteristics and physical layout. The finished disc may be referred to hereinafter as a downloadable DVD (D-DVD) or disc. D-DVD will be employed for ease of reference and should not be construed as limiting. To the player/drive and to the consumer the disc appears exactly the same as a standard replicated disc, given the same DVD content and the disc cannot be further recorded and therefore is a DVD-Video Read-Only Disc.

Aspects of the present invention reduce the complexity of disc formatting and recording processes by performing most pre-processing once in a central, secure and controlled environment. This greatly reduces the hardware complexity and greatly reduces the data processing requirements on the in-store, in-kiosk or in-home recorder system and electronics. In addition, embodiments of the present invention may be employed for small run/limited printings of DVDs or CDs.

In one embodiment, a final Eight-to-Sixteen Modulation (EFM+) conversion, which can be simply performed in software or dedicated hardware, reduces the DVD bitstream data transfer and storage by 50%. The EFM+ process converts eight-bit data sequences to 16-bit data sequences. This conversion is finished at the location of the final replication to permit a level of security for the content.

A proprietarily formatted recordable DVD disc may control disc usage rights in the proprietary downloadable DVD (or D-DVD) drives and standard DVD recorders. The authentication process permits for control and monitoring of title quantities produced. Disc serialization can track media usage and can be tied to titles. Individualized unique video and/or audio watermarking and embedded digital serialization can also be forensically utilized to deter and track unauthorized disc copying and pirating.

The ability to use multiple optical pick-up heads for the high speed production of a disc is improved because the D-DVD bitstream is supplied to the DVD burner pre-processed and can be serially streamed in parallel to multiple write heads. Without preprocessed data in the D-DVD bitstream format, aspects of the present invention would be extremely difficult to realize because of the complexity, high computer processing unit (CPU) utilization and cost of having to fully process multiple data files in parallel.

It is to be understood that the present invention is described in terms of a video recording system; however, the present invention is much broader and may include any digital multimedia system, which is capable of delivery over a network, from a kiosk or directly from a secured server or work station. In addition, the present invention is applicable to any recording method or media including recording data taken by telephone, set top boxes, computer, satellite links, etc. The present invention is described in terms of a digital video recording (DVD) device; however, the concepts of the present invention may be extended to other types of media, such as compact discs, high definition (HD) DVDs, Blu-Ray, hybrids thereof, etc.

It should be further understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

Referring now in specific detail to the drawings in which like reference numerals identify similar or identical elements throughout the several views, and initially to FIG. 1, an in-store replication system 10 is illustratively shown in accordance with an exemplary embodiment. A content owner 12 provides content assets 14 (e.g., audio and video assets, which may include movies, songs, programs or any other protected material). Content owner 12 prepares audio, video, navigation flowcharts, graphics and other ancillary information that is to be included in a final downloadable DVD (D-DVD) and transfers this information to compression and authoring facility 16.

The assets 14 are employed by a compression and authoring (C&A) facility 16. C&A facility 16 employs compression and authoring tools 18 to encode, compress, format and edit the content in a form which can be employed by features of the present invention. The authoring and compression facility 16 performs compression of audio and video. Menus, subtitles and other ancillary information are configured for DVD and final navigational programming is performed. Optional anti-copy or anti-rip programming 20 is added to content and final file set prepared for delivery to D-DVD processing center 22.

The content from the C&A facility 16 is provided to processing center 22. Processing center 22 may also be referred to as a D-DVD bitstream mastering center, which may include replicator (manufacturer), an authoring facility or content provider. Partial DVD formatting pre-processing is provided at processing center 22, which is preferably located at a central location (not necessarily at the store location, but at a local server on a network (e.g., cable, telephone, satellite, etc.) or on the Internet). The processing center 22 performs many formatting and preprocessing steps to ensure compliance with existing standards and provide a level of security that is satisfactory to the content owner. For example, Content Scrambling System (CSS) is desired by studio customers to be able to enforce prosecution of illegal copying of movie content through the Digital Millennium Copyright Act (DMCA), and is therefore included by CSS key management 24. CSS encryption 28 follows the CSS encryption standards and limits access of the encrypted keys to only those licensed or authorized to receive and use such keys.

The content is received at the D-DVD processing center 22. The processing center 22 may be a DVD replication, compression and authoring facility or other facility that is licensed to perform Content Scrambling System (CSS) copy protection encryption. The following takes place in the processing center. As with normal replication processing, processing center 22 using CSS key management 24 chooses CSS Disc Keys for delivery to DVD CCA 25 for encryption in block 28 using a master key or keys 26 and return the keys to processing center 22. An encrypted disc key is used to encrypt a disc title key in block 30.

The DVD content delivered from the compression and authoring facility 16 may be processed for audio and/or video watermarking to further protect content for forensic protection in block 32. The watermarking preprocessing 32 may be optionally performed. The processing can include a complete watermarking process or tagging for individualized watermarking at the D-DVD disc burning stage. This process differs from the conventional DVD replication process and is a new function.

Sector addition and tagging for creation of zones that can be "Pulse Length Modulated" prior to the disc recording stage for individualized serialization of each disc produced is performed in block 34. The final product will be "Pulse Length Serialized" in block 106 in accordance with the tagging performed in block 34. The serialization is a machine readable unique number for the sector and/or for the recorded media object. This serialization can be used for tracking purposes, copy protection functions, Internet activation/marketing/data collection processes and other uses.

Content or other data is then broken into sectors, the sectors (up to 50%) are CSS scrambled in block 34, and DVD formatted. DVD Error Detection Codes (EDC) and Error Correction Codes (ECC) are then generated in block 36.

The normal DVD encoding process would now transform the eight bit data bytes into 16 bit words. This encoding process is not performed at this step to reduce the data file size and as an extra security function since these partially encoded/formatted DVD files are not directly usable to produce DVD-Video discs. Lead-In and Lead-Out information are then appended to the data or appended at the burn-in stage to reduce file size further (could be portions or all of the Lead-In/Out data). Bit stream formatting in block 38 is used to prepare the resultant stream into digital data structures that may be readily stored on a computer system (e.g., file formatting may be included as well). This represents a D-DVD-Bitstream. The DVD content formatting process is similar to that used in normal DVD-Video replication processes except for at least the following aspects: the audio and/or video watermarking, the "Pulse Length Serialized" sector creation and tagging, the elimination of the final eight-to-sixteen modulation process and the D-DVD Bitstream formatting process. Other modulation schemes are also contemplated and may be employed such as for HD DVD and BD.

The D-DVD Bitstream is then transferred to a hard disc library 40 for storage. D-DVD Bitstream data files are then archived to suitable media for delivery to a centrally located package processing/server center (PPSC) 42. The D-DVD Bitstream from block 40 may be packaged with disc and package artwork and encrypted for secure transmission and storage on either the in-store D-DVD Bitstream server 60 or in bitstream library 40 (or on the in-home PC hard disc, see FIG. 2).

The D-DVD Bitstream archived data files are delivered to the PPSC 42. The PPSC 42 performs the following functions. The complete D-DVD Bitstream Packages are created in block 46 by adding disc label artwork, collateral material artwork and other package information. In block 48, the D-DVD Bitstream Package is encrypted with suitable encryption software, stored for example, in the Bitstream Package Library server system 60 and archived to a suitable medium. The PPSC system 42 performs authentication and ancillary data management in block 50, transaction control and transaction record management in block 52, and in-store library "D-DVD Bitstream Package" management and package transfer in block 54.

For in-store replication (or in-factory or on-line retailer) in a store or retail environment 120, a secure authenticated channel 56 high-speed connection is preferably utilized for "D-DVD Bitstream Package" file management. For "in-home replication" (FIG. 2) the Internet or other network 57 is utilized for downloading of files to be burned to a D-DVD disc.

The PPSC 42 also pre-loads servers 60 that are utilized for mass storage in the in-store D-DVD production systems in the retail environment with the appropriate Bitstream Library 62 prior to delivery to the retailer.

A blank media 72 is produced by a recordable media manufacturer 74 in block 75. The media 72 may be manufactured to a proprietary specification with the following characteristics. The disc 72 may be blank or produced using a proprietary wobbled pre-groove format or other format that is different than that used in industry standard DVD recordable media. The proprietary format would be used to identify this media as D-DVD media in a D-DVD recording drive. The D-DVD recording drive may be configured to be only capable of recording to the proprietary formatted media, and this media may not function on industry standard DVD burners such as those used in a personal computer (PC) or set top box DVD burners. A wobbled pre-groove may be encoded by frequency modulation or other methods to include disc authentication, lot number, store number and other information in block 76. Other methods may be employed to embed information on these discs. Other identification/serialization information can be added to media by use of, e.g., Burst Cutting Area (BCA) or other means. The blank media 72 would permit a read only disk to be produced.

An in-store environment 80 includes the following subsystems and performs the following functions. A transaction manager 82 houses a "Bitstream Package Library" server 60, which performs inventory management in block 84, incoming package receipt with package manager 86, authentication and ancillary data management 88, transaction control and transaction record management 90 and manages the secure authenticated channel 56 for communication with the PPSC 42. Kiosks or terminals 92 are used for content search and transaction functionality or other user interface functions.

A D-DVD disc burner/printer engine (DDBP) 94 is interfaced with the transaction manager 82. The DDBP 94 includes the following subsystems and performs the following functions. The subsystems may include a PC 100 or other computer based control system, a D-DVD disc reading/recording drive 95 (which may be proprietary), a disc printing engine 96, hardware subsystems and communication channels to the transaction manager 82. A disc order is transferred to the DDBP 94 from kiosk 92 using transaction control 93 and disc media 72 is transferred to a disc drive 110. The media 72 may be purchased in advance or provided at the time the content is ordered. This media 72 is then read, confirmed to be D-DVD media, authentication and serialization data is then read from the disc for transfer through an authentication/ancillary data management subsystem 97 to the transaction manager 82 for final authentication from the PPSC 42.

Upon authentication, the selected content (encrypted D-DVD Bitstream Package) is then transferred to the DDBP 94 for decryption in block 98 in software in watermarking tagging data, serialization tagging data, label artwork, and collateral material artwork.

PC 100 and/or dedicated hardware/software reads watermark tagging data in block 102 and watermark selected sectors of the 50% of sectors that are not CSS encrypted. Dedicated hardware/software also reads serialization tagging data in block 106 that is used to uniquely identify sectors that are allocated for modification. The identified sectors can either be modified by selectively changing data content by shifting the timing of data transitions and thus disc pit edge locations on the disc, which result in differing data patterns that are recorded on the D-DVD disc. As an alternative, the entire sector data can be replaced with one including the desired data pattern. An alternative method may either be performed prior to or after the eight-to-sixteen modulation in block 104. This data can be used to uniquely identify each disc (e.g., pulse length modulation) with a unique machine readable serial number or may also be used for additional cryptographic functions.

Drive 110 then receives the fully processed "D-DVD Bitstream" and in a streaming mode records the data beginning at the start of Lead-In at the very beginning of the recordable zone and ending with the end of Lead-Out at the very end of the recordable zone on the disc. The recorded disc is then a pre-recorded disc with identical characteristics to that of a normally replicated DVD-Video Read Only Disc. This disc cannot be further recorded or altered. With equivalent input content a D-DVD Disc and a DVD-Video Read Only Disc would read and perform identically. Because this disc is identical in data content, logical structure, physical structure, electrical characteristics and CSS encryption to that of a DVD-Video Read Only Disc high probability of playability on DVD players and recorders is provided.

After completion of recording, the disc may be verified or partially verified to ensure proper content and quality characteristics using blocks 95 and 97. The disc is then transferred to the disc printing engine 96 for decoration. Collateral paperwork is then printed and the final product is assembled into a package for delivery to the consumer.

Advantageously, in accordance with aspects of the present invention, a pre-processed stream of data content, with watermarking and encrypted with CSS is provided to a kiosk or in-store facility. Since the stream of data is preprocessed, there are fewer operations at the time a D-DVD is recorded to. This preprocessed data stream is protected in its preprocessed state by CSS encryption and any other security measure employed (e.g., watermarks, etc.). In addition, since the data stream has not yet been fully modulated to its final form, the stream is protected from use in stages prior to final replication.

At the time of recording to media 72, a modulation process (e.g., eight-to-sixteen bit modulation or other modulation schemes such as e.g., one-to-seven PP (Parity Preserved), eight-to-twelve and eight-to-fourteen modulation) is performed on the stream just before the stream is written to the media disc 72. The data stream is then written directly to the media.

Figure 2:
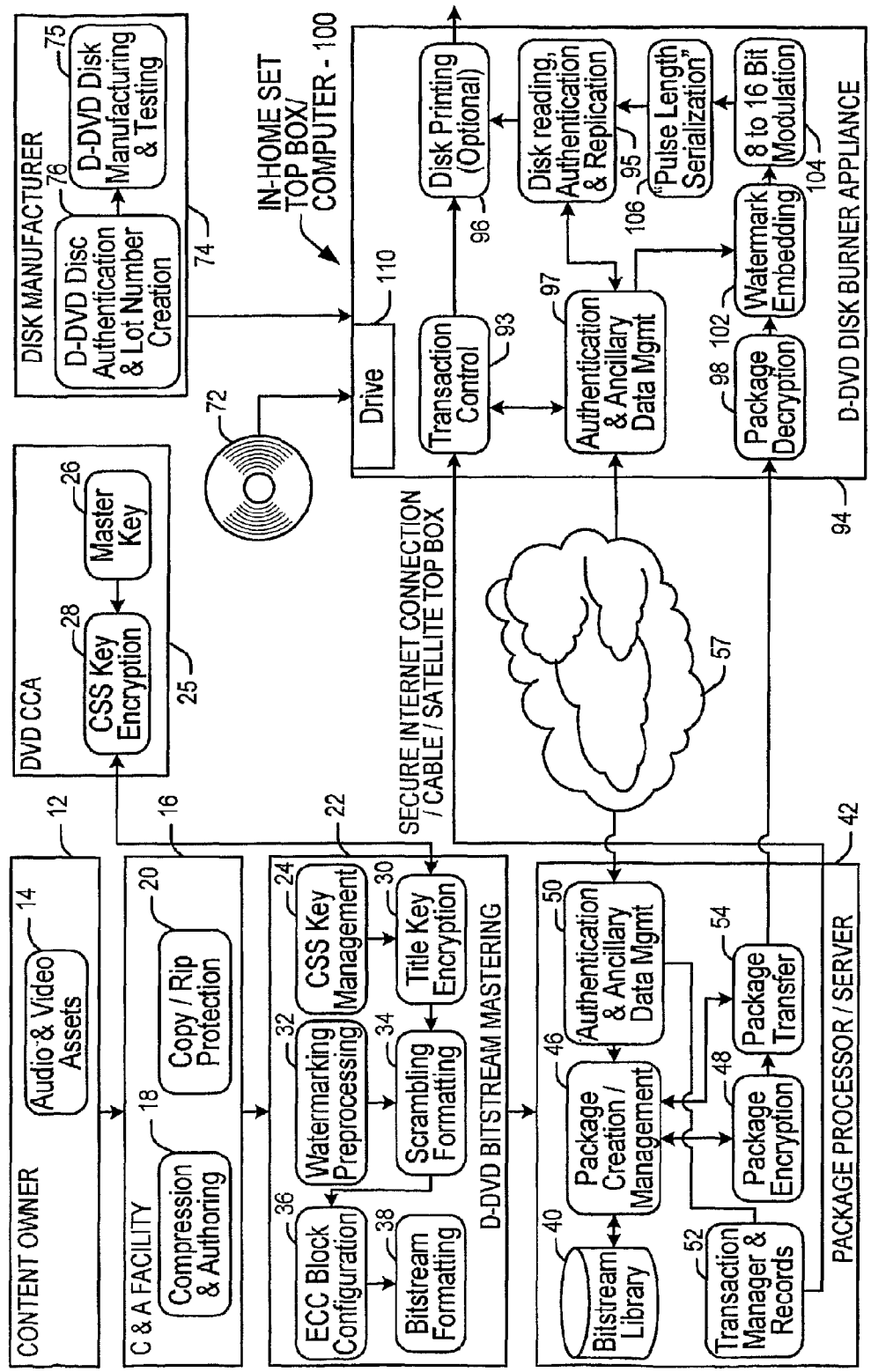
FIG. 2 is block/flow diagram of an exemplary system/method for replicating media objects (e.g., DVD's) from a home or consumer location in accordance with another exemplary embodiment of the present invention.

Referring to FIG. 2, a system/method 200 for in-home DVD replication is illustratively shown. System 200 is conceptually similar to that of the in-store DVD replication embodiment described in FIG. 1, except that content is directly delivered through Internet, telephone, cable or satellite networks to a set top box or computer including similar decryption, watermarking (optional), serialization (optional), eight-to-sixteen conversion and the proprietary drive to record the D-DVD Bitstream data. This drive can be built into stand-alone Internet connected, cable or satellite set top boxes. Disc printing in block 96 is optional for the in-home embodiment.

The in-home disc burner 94 receives the partially encoded data stream from the network 57 and computer or set top box 100 finishes the encoding, e.g., eight-to-sixteen modulation, etc. Prior to writing the fully encoded data stream to the media object 72.

In accordance with FIGS. 1 and 2, the final disc processing step of secure decryption 98 and Eight-to-Sixteen Modulation (EFM+) 94 is performed in the in-store or in-home recordable DVD drive on a partially encoded bit stream received by the burner or media recording device. Optionally, store specific and/or disc specific audio and/or video watermarking (102) and/or disc serialization (104) can be inserted into the Bitstream. The Bitstream is serially streamed from library 40 (or 62) and recorded to the recordable DVD media. The "D-DVD Bitstream" that is recorded on the in-store/in-kiosk/in-factory/in-home drives is/can be identical to the digital data bit stream that is recorded on an industry standard Pre-recorded DVD-Video discs that are produced in standard replication processes. Discs and collateral material can be printed and packaged similar to those produced in the standard replication process. Since the data stream may be similar to creating a glass master for DVD manufacture, the process in accordance with aspects of the present disclosure may permit the writing of discs for short runs or limited distribution media in a factory environment.

Advantageously, the final disc has identical electrical, logical, CSS copy protection and physical characteristics as a standard replicated disc and therefore is playable on legacy and new DVD-Video players and PC DVD drives/decoder software. The process can be viewed as in-store replication or in-home replication of standard DVD-Video product. Proprietary recordable media may alternately be used that is custom formatted to include unique disc type identifiers, authentication data, store identification and lot number identification. Discs can be individually serialized through, e.g., Burst Cutting Area (BCA) or "Pulse Length Serialization" or other means to individually number each disc in a machine readable format.

The recorder system includes ways to authenticate the media to be recorded in the D-DVD recorder and only D-DVD media can be used for in-store replication. Additionally the D-DVD media cannot be recorded to in a standard DVD recorder. The system may include a kiosk user interface or PC user interface and ways for transaction record keeping and reporting.

Figure 3:
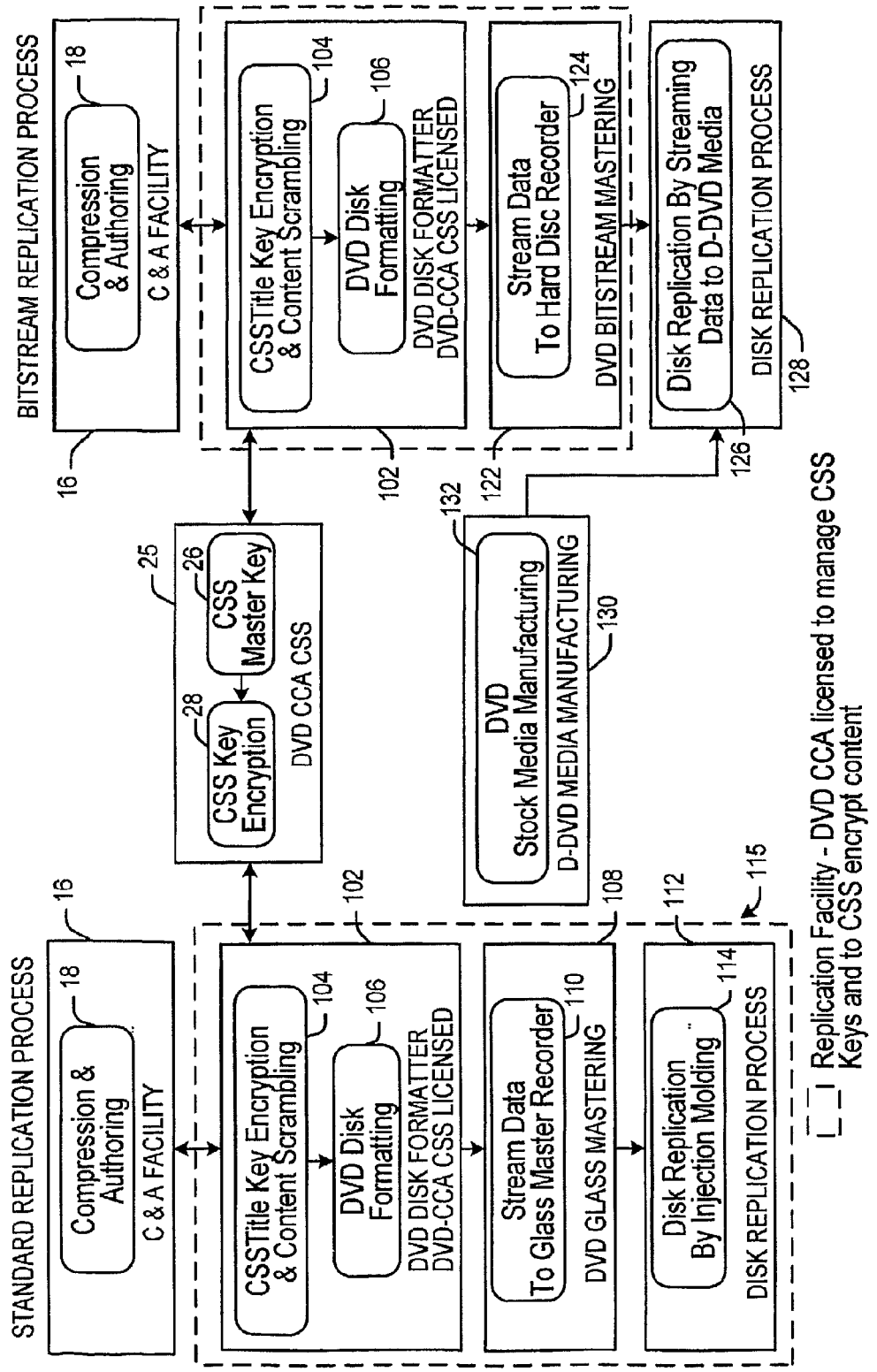
FIG. 3 is block/flow diagram showing an exemplary comparison between a standard DVD manufacture process and a system/method for replicating media objects (e.g., DVD's) in accordance with another exemplary embodiment of the present invention

Referring to FIG. 3, a comparison between a standard DVD manufacturing process and the inventive process is illustratively shown to demonstrate some of the aspects and advantages of the present invention. The standard process is includes in block 16 and 115. In block 16, a standard C&A facility includes performing compression and authoring of content for a DVD. Block 115 shows the process steps performed within a licensed replication facility, which is licensed to manage CSS keys and to CSS encrypt content. A disc formatter 102 provides CSS key encryption and content scrambling in block 104 and DVD disc formatting in block 106. Block 104 receives CSS key encryption information from block 25. A fully CSS encrypted, DVD formatted and 8-16 bit modulated data stream is created ready to be employed to produce a glass master disc in a glass mastering block 108.

The glass mastering includes streaming the data to a glass master recorder in block 110 to create a pit pattern applied to a glass master copy of the DVD. Disc replication 112 is performed by replicating the glass master pattern in molds to produce DVDs by injection molding 114 for the mass production of DVDs.

In accordance with embodiments of the present disclosure, instead of glass mastering 108, bitstream mastering 122 is performed. Bitstream mastering 122 includes streaming data to a hard disc or other read/write memory in block 124. The data stream is partially encoded but preprocessed to include CSS encryption, DVD formatting, but not yet eight-to-sixteen bit modulated. Note that blocks 102 and 122 remain in the replication facility which is CCA licensed to manage CSS keys and to CSS encrypt content.

Disc replication 128 includes streaming data to D-DVD media in block 126. During or just prior to this replication process, modulation or complete encoding is performed to finalize the data stream to be recorded on the DVD. The DVD media 132 may be a blank or specially fabricated or formatted disc produced by a D-DVD manufacturer 130. The blank disc may be formatted as a read only disc for play only in accordance with standard guidelines, e.g., DVD read only bits are included in the recorded content. The read only disc will permit playing but not recording, and only permit decryption if used in a CSS enabled/authorized device.

Having described preferred embodiments for systems and methods for DVD replication (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described

The invention claimed is:

1. A system for replicating protected content on media following partial encoding of the content during DVD mastering, comprising:
   a controller for enabling replicating of the content from partially encoded content received at the controller after the DVD mastering of the content by a content mastering facility at a location different from the system for replicating the protected content, wherein the partially encoded content was generated during the DVD mastering and was protected from use in stages prior to final replication;
   a hardware processor coupled to the controller for fully modulating the partially encoded content by performing one of an eight to sixteen modulation, an eight to twelve modulation and a one to seven parity preserved modulation to generate completely encoded content; and;
   a drive coupled to the processor for receiving the completely encoded content generated by the processor and for recording the completely encoded content on media for reading by a device other than said drive.

2. The system as recited in claim 1, further comprising logic for serializing the media on which the content is recorded in accordance with tagging information.

3. The system as recited in claim 2, wherein the logic for serializing selects sectors for modification during recording of content on the media.

4. The system as recited in claim 3, wherein the logic for serializing modifies the selected sectors by selectively changing data content by shifting timing of data transitions when recording the media content on the media to provide differing data patterns on the media.

5. The system as recited in claim 3, wherein logic for serializing the media replaces the selected sectors with a desired data pattern during recording of the content.

6. The system as recited in claim 1, wherein the processor is connected to a network.

7. An apparatus for replicating protected content following partial encoding of the content during DVD mastering, comprising:
   a hardware processor for receiving partially encoded content after the DVD mastering of the content by a content mastering facility at a location different from the apparatus for replicating the protected content, wherein the partially encoded content was generated during the DVD mastering and was protected from use in stages prior to final replication and for fully modulating the partially encoded content by performing one of an eight to sixteen modulation, an eight to twelve modulation and a one to seven parity preserved modulation to generate completely encoded content; and
   a drive coupled to the processor for receiving the completely encoded content generated by the processor and for recording the completely encoded content on media for reading by a device other than said drive.

8. The apparatus as recited in claim 7, wherein the media on which the content is recorded is a blank disc.

9. The apparatus as recited in claim 7, further comprising logic for serializing the media on which the content is recorded for identification of the media in accordance with tagging information.

10. The apparatus as recited in claim 9, wherein logic for serializing the media identifies selected sectors for modification during recording of the content on the media.

11. The apparatus as recited in claim 10, wherein the logic for serializing modifies the selected sectors by selectively changing data content by shifting timing of data transitions on the media to provide differing data patterns on the media.

12. The apparatus as recited in claim 10, wherein the logic for serializing replaces selected sectors with a desired data pattern during recording of the media.

13. The apparatus as recited in claim 7, wherein the processor and drive are included in a set top box.

14. A method for replicating protected content at a replication facility following partial encoding of the content during DVD mastering, comprising:
   receiving a partially encoded content data stream, by a controller of the replication facility, after the DVD mastering of the content by a content mastering facility at a location different from the replication facility, wherein the partially encoded content data stream was generated during the DVD mastering and was protected from use in stages prior to final replication;
   fully modulating, by a hardware processor of the replication facility, the partially encoded content data stream, after the DVD mastering, by performing one of an eight to sixteen modulation, an eight to twelve modulation and a one to seven parity preserved modulation to generate completely encoded content; and
   recording, by a drive of the replication facility, on media the completely encoded content such that the media is readable by standard equipment other than said drive.

15. The method as recited in claim 14, wherein the blank media includes a blank digital video disk.

16. The method as recited in claim 14, further comprising serializing for identification each media.

17. The method as recited in claim 16, wherein the serializing includes identifying selected sectors for modification during recording of content on the media.

18. The method as recited in claim 17, wherein the selected sectors are modified by selectively changing data content by shifting timing of data transitions on the media to provide differing data patterns on the media.

19. The method as recited in claim 17, wherein the selected sectors are replaced with a desired data pattern during recording of the media.

* * * * *